US011900691B2

(12) United States Patent
Maucher et al.

(10) Patent No.: US 11,900,691 B2
(45) Date of Patent: Feb. 13, 2024

(54) METHOD FOR EVALUATING SENSOR DATA, INCLUDING EXPANDED OBJECT RECOGNITION

(71) Applicant: Robert Bosch GmbH, Stuttgart (DE)

(72) Inventors: Dominik Maucher, Stuttgart (DE); Heinz Hertlein, Erlenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 474 days.

(21) Appl. No.: 17/265,437

(22) PCT Filed: Sep. 2, 2019

(86) PCT No.: PCT/EP2019/073316
§ 371 (c)(1),
(2) Date: Feb. 2, 2021

(87) PCT Pub. No.: WO2020/048909
PCT Pub. Date: Mar. 12, 2020

(65) Prior Publication Data
US 2021/0303879 A1 Sep. 30, 2021

(30) Foreign Application Priority Data
Sep. 4, 2018 (DE) .......................... 102018214959.3

(51) Int. Cl.
G06V 20/58 (2022.01)
G06F 18/25 (2023.01)
(Continued)

(52) U.S. Cl.
CPC .......... G06V 20/584 (2022.01); G06F 18/253 (2023.01); G06N 20/00 (2019.01);
(Continued)

(58) Field of Classification Search
CPC .... G06V 20/584; G06V 20/58; G06V 20/588; G06V 2201/07; G06F 18/253; G06N 20/00; G06T 7/529; B60W 40/02
See application file for complete search history.

(56) References Cited

U.S. PATENT DOCUMENTS 10,988,110 B1* 4/2021 Patnaik ............ G08G 1/096811
10,997,429 B2* 5/2021 Golov .................... G06V 20/56
(Continued)

FOREIGN PATENT DOCUMENTS

DE 102014224762 A1 6/2016
EP 1686537 A2 8/2006
(Continued)

OTHER PUBLICATIONS

International Search Report for PCT/EP2019/073316, dated Nov. 28, 2019.

Primary Examiner — Bobbak Safaipour
(74) Attorney, Agent, or Firm — NORTON ROSE FULBRIGHT US LLP; Gerard A. Messina

(57) ABSTRACT

A method for evaluating sensor data. The sensor data are ascertained by scanning a surrounding area, using at least one sensor. On the basis of the sensor data, object detection is carried out for determining objects from the sensor data. Object filtering is carried out. Surface characteristics of at least one object are identified, and/or the surface characteristics of at least one object are ascertained with the aid of access to a database. A control unit is also described.

8 Claims, 3 Drawing Sheets

(51) Int. Cl.
*G06N 20/00* (2019.01)
*G06T 7/529* (2017.01)
*G06V 20/56* (2022.01)

(52) U.S. Cl.
CPC .............. *G06T 7/529* (2017.01); *G06V 20/58* (2022.01); *G06V 20/588* (2022.01); *G06V 2201/07* (2022.01)

(56) References Cited

U.S. PATENT DOCUMENTS

| | | | |
|---|---|---|---|
| 11,085,775 B2* | 8/2021 | Kubiak | G01S 7/412 |
| 11,618,502 B2* | 4/2023 | Senn | G01S 17/42 |
| | | | 701/28 |
| 2012/0268602 A1* | 10/2012 | Hirai | G06T 7/136 |
| | | | 348/148 |
| 2014/0375770 A1* | 12/2014 | Habel | G01N 21/94 |
| | | | 348/46 |
| 2018/0276832 A1* | 9/2018 | Aikin | H04N 23/56 |
| 2019/0080597 A1* | 3/2019 | Langhans | G06V 20/582 |
| 2020/0334488 A1* | 10/2020 | Kobayashi | G06V 20/56 |
| 2020/0349366 A1* | 11/2020 | Takemura | B60Q 9/00 |
| 2021/0018611 A1* | 1/2021 | Chhabra | G01S 17/87 |

FOREIGN PATENT DOCUMENTS

| | | |
|---|---|---|
| EP | 2879109 A1 | 6/2015 |
| WO | 2018060313 A1 | 4/2018 |

* cited by examiner

METHOD FOR EVALUATING SENSOR DATA, INCLUDING EXPANDED OBJECT RECOGNITION

FIELD

The present invention relates to a method for evaluating sensor data; sensor data being ascertained by scanning a surrounding area, using at least one sensor; and on the basis of the sensor data, object detection being carried out for determining objects from the sensor data; and object filtering being carried out. In addition, the present invention relates to a control unit.

BACKGROUND INFORMATION

In driver assistance systems and automated driving functions, the surroundings monitored by sensors are analyzed. When sensors typically utilized in the field, such as radar sensors, lidar sensors and cameras, are used, then, depending on the application, a sufficient correct-positive rate of the relevant objects in the surrounding area to be recognized may often only be attained, if a significantly high false-positive rate is accepted.

However, depending on downstream functions, a high false-positive rate may limit the availability of a function considerably. In the general case, the increased false-positive rate may result from phantom objects, which are formed by reflection or multiple reflections. The type and origin of phantom objects differ as a function of the sensor modality.

SUMMARY

An object of the present invention is to provide a method for evaluating sensor data, which has a low false-positive rate.

This object may achieved in accordance with an example embodiment of the present invention. Advantageous refinements and example embodiments of the present invention are described herein.

According to one aspect of the present invention, a method for evaluating sensor data is provided; sensor data being ascertained by scanning a surrounding area, using at least one sensor. Based on the sensor data, object detection is carried out for determining objects from the sensor data, and object filtering is carried out; surface characteristics of at least one object being identified, and/or the surface characteristics of at least one object being ascertained with the aid of access to a database.

According to one further aspect of the present invention, a control unit is provided for coupling to at least one sensor and for fetching out sensor data of the at least one sensor; the control unit being configured to execute all steps of the method.

Using the method, objects may be recognized, and the surface characteristics of the recognized objects may be ascertained or estimated. The objects may also take the form of non-classified targets and do not necessarily have to be specified already as defined objects. In light of the additional surface characteristics of the objects or targets, the accuracy of the sensor data evaluation may be increased, and the reliability of a surround sensor system may be improved.

In this connection, the example method utilizes, in particular, a classifier, which may be trained and trainable. In addition, data stored in a database, for example, map data, may be used to ascertain characteristics of a surface of objects and/or to assign surface characteristics to particular objects.

Therefore, the applicability of the principle is not limited to a particular sensor modality. In addition, by using a multimodal classifier (based on the fusion of several modalities), the reliability of the surround sensors and the functions associated with the sensors may be increased.

By using map data, the method may also be used in cases, in which the necessary identification of the object characteristics from the vehicle is not possible, or not possible with sufficient reliability, or not possible in a sufficiently timely manner.

Using previous knowledge of the surfaces and/or of the surface characteristics in the surrounding area, the method allows the occurrence of phantom objects to be reduced or allows them to be linked to further attributes, in order to improve the object recognition, for example, in downstream sensor fusion.

According to one specific embodiment of the present invention, surface characteristics of at least one recognized object are ascertained concurrently to object detection. Through this, classifiers may be used in a targeted manner, in order to ascertain surface characteristics, which promote, for example, reflections in the case of a specific sensor modality. In particular, on the basis of the ascertained surface characteristics of the objects, it may be checked if identified objects are reflections and are consequently to be classified as phantom objects. Therefore, a direct and/or indirect check of the recognized objects may be carried out, which increases the reliability of the evaluation.

According to a further specific embodiment of the present invention, results of the determination of the surface characteristics may be used in the surface filtering. The ascertained or estimated surface characteristics of objects may be used directly in the sensor-data processing, so that the number of phantom objects is reduced and, consequently, the accuracy of the object states is improved.

According to a further exemplary embodiment of the present invention, during object filtering, a comparison with a database is carried out to ascertain surface characteristics of at least one detected object. According to one embodiment, the database takes the form of a map having stored surface characteristics. This allows a further development of the method to be provided, in which, for example, a highly accurate map already existing may be expanded to include the material properties and/or surface characteristics of static objects.

The object characteristics and/or material properties may relate to, for example, concrete walls, mirrors, glass facades, guardrails, sound barriers and the like, which have an effect on the monitoring of the surroundings and the sensor evaluation due to their surface finish. Using the previous knowledge of the surface of relevant objects, the sensor-data processing may be improved, or, in the case of downstream sensor-data fusion, the accuracy may be increased. In particular, the false-positive rate may be reduced by the method, without affecting the correct-positive rate.

According to a further specific embodiment of the present invention, at least one phantom object in the sensor data is removed or corrected on the basis of the ascertained object characteristics of at least one object. Using the knowledge of the surface characteristics of the objects in the surroundings of the sensor, their influence on the sensor may be determined. For example, the deflection, refraction, diffraction or reflection of beams of a lidar sensor or a radar sensor may be ascertained in light of the surface characteristics and taken into consideration for checking the plausibility of the objects in the sensor-data analysis.

For example, during monitoring of the surroundings by a lidar sensor, a vehicle behind a guardrail may be detected, whereas due to being concealed by a vehicle traveling ahead, the vehicle is detected exclusively as a reflected phantom vehicle. Using the method, the reflecting surface of the guardrail may either be detected or extracted from a map. Using this information, either the phantom object may be removed, or the position of the phantom object may be corrected by triangulation.

According to a further specific embodiment of the present invention, the surface characteristics of at least one recognized object are identified or classified, using machine learning. This may allow, for example, neural networks to be used for providing a classifier, which, for example, in light of a shape of the recognized objects, assigns an expected surface finish to these recognized objects.

According to a further specific embodiment of the present invention, the surface characteristics of at least one recognized object are ascertained in the course of sensor-data fusion, using object filtering, on the basis of access to a database, or surface characteristics already identified are used by at least one recognized object in the course of sensor data fusion by object filtering. The results of the surface estimation may be passed on to the downstream sensor-data fusion element, in order to improve the accuracy there, as well, or to reduce the false-positive rate.

In addition, the object filter may be used on the fusion level. In this instance, in comparison with filtering in the course of sensor-data processing, a higher false-positive rate of the sensors may be permitted, since the filtering occurs later. In comparison with the object filtering on the level of the sensor-data processing, one advantage is the option for the surface estimation of one sensor modality to have an influence on the object recognition of another modality, which means, for example, that the surface estimation of the video camera may improve the object recognition of the lidar sensor. This may allow further sensors to be used to confirm the surface characteristics or to act supportively in the determination of the surface characteristics.

Below, preferred exemplary embodiments of the present invention are explained in greater detail in light of highly simplified, schematic representations.

DETAILED DESCRIPTION OF EXAMPLE EMBODIMENTS

Figure 1:
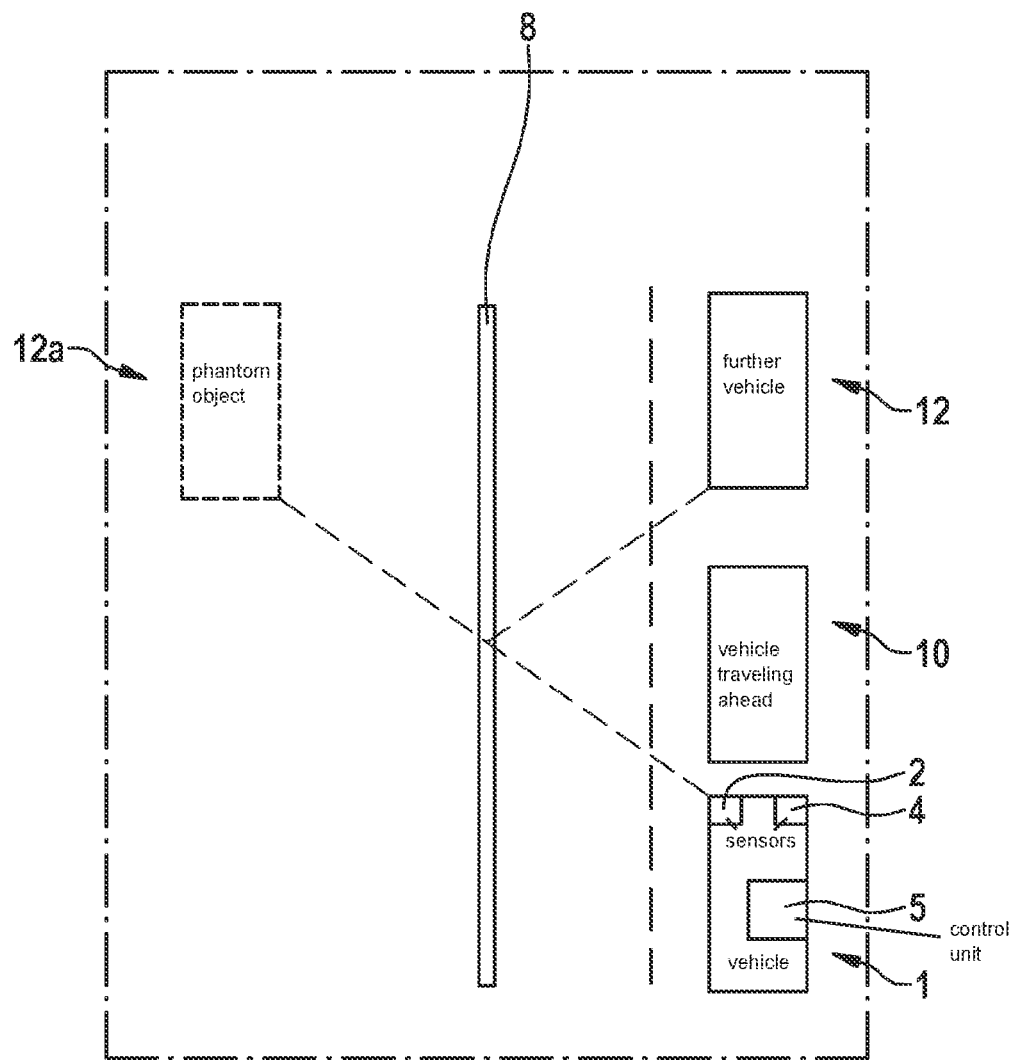
FIG. 1 shows the surroundings of a vehicle having sensors, in order to illustrate a method according to one specific embodiment of the present invention.

The surroundings of a vehicle 1 having sensors 2, 4 are represented in FIG. 1, in order to illustrate a method 6 according to one specific embodiment of the present invention. In particular, the figure shows an example of a traffic situation including two lanes in one direction.

Sensors 2, 4 may be, for example, a lidar sensor 2 and a camera 4.

Sensors 2, 4 are connected to a control unit 5. Control unit 5 is used for fetching out sensor data and for executing method 6.

In the surroundings, the lanes are set apart from each other by a roadway divider 8. Roadway divider 8 has specular surface characteristics.

Vehicle 1 recognizes a vehicle 10 traveling ahead, while due to being concealed by vehicle 10 traveling ahead, further vehicle 12 is only detected as a reflected phantom vehicle 12a. Using method 6, the specular surface of roadway divider 8 may either be detected or ascertained from a map. Therefore, using this information, phantom object 12a may either be removed or put at the correct position of further vehicle 12 by triangulation.

Figure 2:
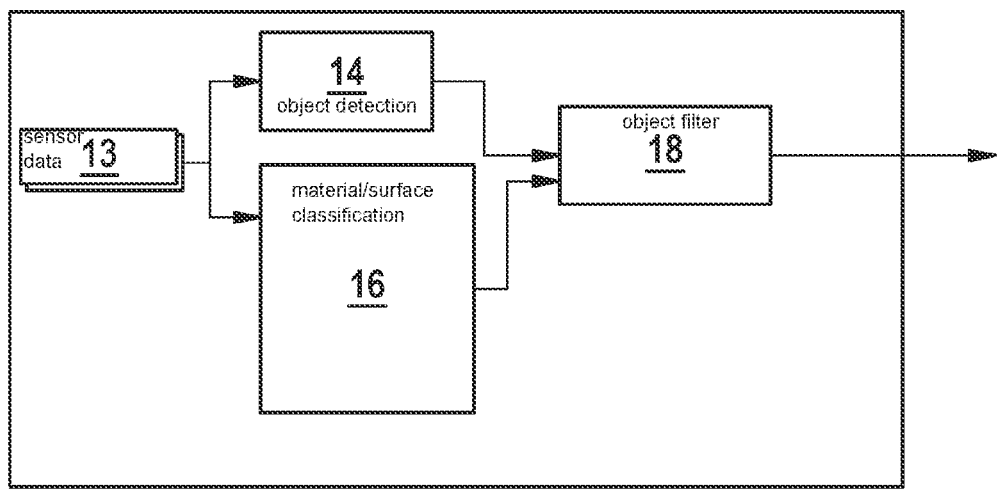
FIG. 2 shows a schematic flow chart for illustrating the method according to a further specific embodiment of the present invention.

FIG. 2 shows a schematic flow chart for illustrating the method 6 according to a further specific embodiment. In particular, a sensor architecture is represented. In this context, object detection 14 takes place with the aid of recorded sensor data 13 of the detector of sensor 2, 4. Material/surface classification 16 is carried out concurrently to object detection 14. In light of surface estimation 16 and the object data, a downstream object filter 18 may reduce the false-positive rate and/or increase the correct-positive rate. Surface classification 16 may be implemented, for example, by a previously trained neural network.

Figure 3:
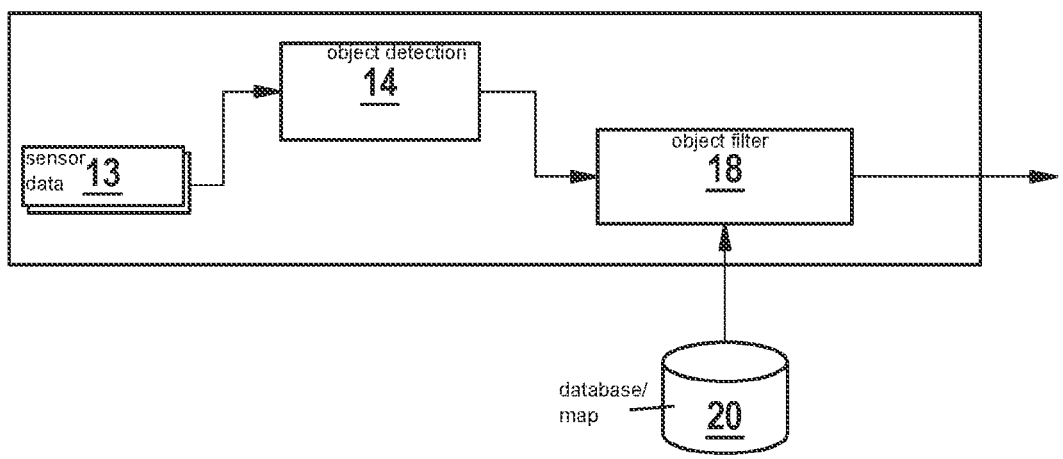
FIG. 3 shows a schematic flow chart for illustrating the method according to a further specific embodiment of the present invention, which includes an object filter that accesses a database.

A schematic flow chart for illustrating the method 6 according to a further specific embodiment is shown in FIG. 3, the further specific embodiment including an object filter 18 that accesses a database 20. In this connection, in particular, the information regarding the surface characteristic is read out of a map 20; object filter 18 assuming the same function as the surface classification 16 shown in FIG. 2. Consequently, recognized objects 8, 10, 12, 12a are assigned the surface characteristics by object filter 18. Subsequently, the results of object filter 18 may be processed further.

Figure 4:
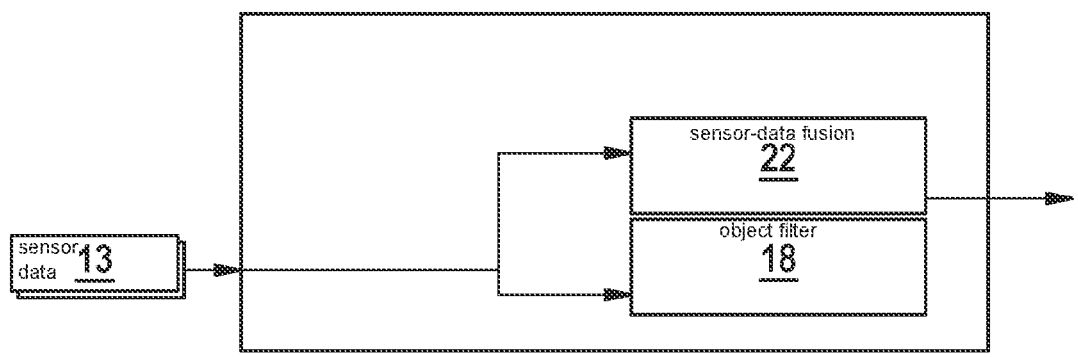
FIG. 4 shows a schematic flow chart for illustrating the method according to a further specific embodiment of the present invention, which includes sensor-data fusion.

A schematic flow chart for illustrating the method 6 according to a further specific embodiment, which includes sensor-data fusion 22, is represented in FIG. 4. In this connection, object filter 18 is applied on the fusion level. Here, in comparison with the filtering in the course of the sensor-data processing, a higher false-positive rate of sensors 2, 4 may be permitted, since object filtering 18 occurs later. In comparison with the object filtering on the level of the sensor-data processing, one advantage is the option for the surface estimation of one sensor modality to have an influence on the object recognition of another modality, which means, for example, that the surface estimation of video camera 4 may improve object recognition 16 of lidar sensor 2. The processed sensor data 13 from object filtering element 18 and sensor-data fusion element 22, which include potential objects and surface characteristics, may subsequently be processed further. This may be used, for example, to generate or to update a model of the surroundings.

Figure 5:
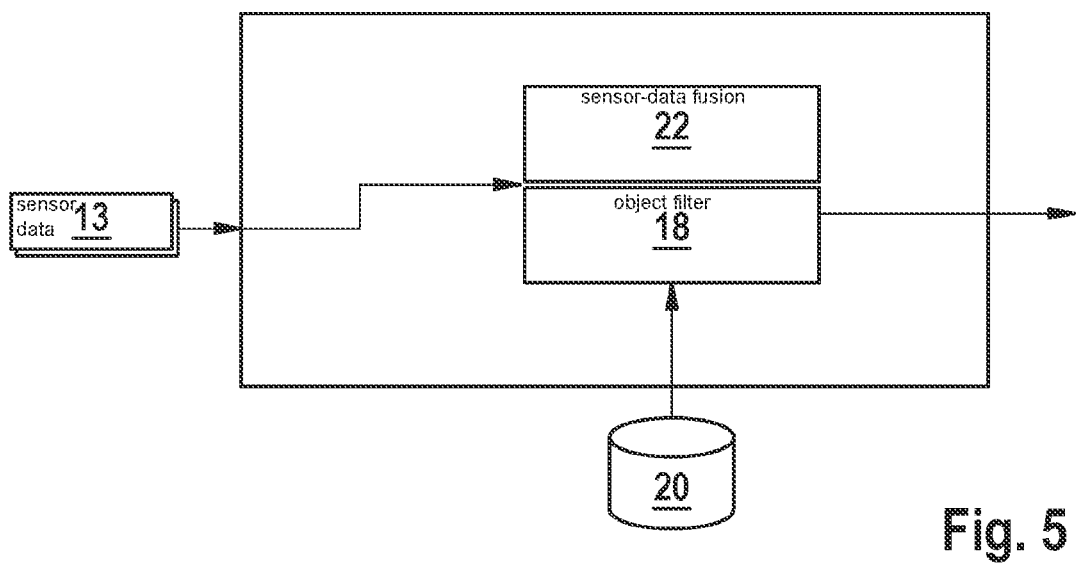
FIG. 5 shows a schematic flow chart for illustrating the method according to a further specific embodiment of the present invention, which includes an object filter that accesses a database in the course of sensor-data fusion.

FIG. 5 shows a schematic flow chart for illustrating the method 6 according to a further specific embodiment, which includes an object filter 18 that accesses a database 20 in the course of sensor-data fusion 22. In particular, a fusion architecture is shown, in which the object filter 18 on the level of the sensor-data fusion accesses a database 20, in order to carry out identification of surface characteristics on the basis of sensor data 13 of a plurality of sensors 2, 4. In this connection, the information regarding the surface characteristic is read out of a map 20, for example.

What is claimed is:

1. A method for evaluating sensor data on a road, the method comprising:
    ascertaining sensor data by scanning a surrounding area, using at least one sensor;
    based on the sensor data, carrying out object detection for determining objects from the sensor data;
    carrying out object filtering; and
    identifying surface characteristics of at least one object, and/or the surface characteristics of the at least one object are ascertained by using access to a database;
    wherein the road has lanes which are set apart from one another by a roadway divider having specular characteristics, and
    wherein at least one phantom object in the sensor data is removed or a position thereof is corrected based on the ascertained surface characteristics of the at least one object by triangulation.

2. The method as recited in claim 1, wherein the surface characteristics of at least one recognized object are ascertained concurrently to object detection.

3. The method as recited in claim 2, wherein the surface characteristics identified and/or ascertained are used in the object filtering.

4. The method as recited in claim 1, wherein during the object filtering, a comparison with a database is carried out to ascertain surface characteristics of at least one detected object.

5. The method as recited in claim 1, wherein the database is in the form of a map having stored surface characteristics.

6. The method as recited in claim 1, wherein the surface characteristics of at least one recognized object are identified or classified, using machine learning.

7. The method as recited in claim 1, wherein: (i) the surface characteristics of at least one recognized object are ascertained in the course of sensor-data fusion, using object filtering, based on the access to the database, or (ii) previously detected surface characteristics of at least one recognized object are used by object filtering in the course of sensor data fusion.

8. An apparatus for coupling to at least one sensor comprising:
    a control unit configured for fetching out sensor data on a road of the at least one sensor, and evaluating the sensor data, by performing the following:
    ascertaining the sensor data by scanning a surrounding area, using the at least one sensor;
    based on the sensor data, carrying out object detection for determining objects from the sensor data;
    carrying out object filtering; and
    identifying surface characteristics of at least one object, and/or ascertaining the surface characteristics of the at least one object by accessing a database;
    wherein the road has lanes which are set apart from one another by a roadway divider having specular characteristics, and
    wherein at least one phantom object in the sensor data is removed or a position thereof is corrected based on the ascertained surface characteristics of the at least one object by triangulation.

* * * * *